United States Patent [19]

Strobel

[11] Patent Number: 5,579,449
[45] Date of Patent: Nov. 26, 1996

[54] METHOD FOR DOWNLOADING AND PRINTING BITMAPPED GRAPHICS

[75] Inventor: Kevin L. Strobel, Fairfield, Conn.

[73] Assignee: Pitney Bowes Inc., Stamford, Conn.

[21] Appl. No.: 360,907

[22] Filed: Dec. 21, 1994

[51] Int. Cl.$^6$ .................................................. G06K 15/00
[52] U.S. Cl. ........................................ 395/110; 395/114
[58] Field of Search ................................ 395/110, 115, 395/114, 117, 150, 151; 400/70, 71, 76

[56] References Cited

U.S. PATENT DOCUMENTS

| | | | |
|---|---|---|---|
| 4,520,455 | 5/1985 | Crean et al. | 364/900 |
| 4,843,405 | 6/1989 | Morikawa et al. | 346/1.1 |
| 4,896,275 | 1/1990 | Jackson | 364/519 |
| 4,996,649 | 2/1991 | Kamei et al. | 364/518 |
| 5,068,807 | 11/1991 | Ikenoue | 395/115 |
| 5,105,369 | 4/1992 | Nelson | 395/101 |
| 5,129,050 | 7/1992 | Ikenoue et al. | 395/115 |
| 5,142,614 | 8/1992 | Schneider et al. | 395/115 |
| 5,148,293 | 9/1992 | Miyachi | 358/444 |
| 5,150,456 | 9/1992 | Wu et al. | 395/114 |
| 5,256,863 | 10/1993 | Ferguson et al. | 235/383 |
| 5,295,238 | 3/1994 | Dickson | 395/150 |
| 5,337,258 | 8/1994 | Dennis | 365/551.01 |

*Primary Examiner*—Arthur G. Evans
*Attorney, Agent, or Firm*—Robert E. Meyer; Melvin J. Scolnick; Robert H. Whisker

[57] ABSTRACT

The invention is a method whereby soft font data and graphic images which are stored on a host computer in a variety of formats are converted to a bitmap graphics format comprised of a group of printer commands designed for bitmap graphics printing and then downloaded and printed using a single set of printer control commands.

8 Claims, 7 Drawing Sheets

FIG. 4

RASTER DATA FOR DIAMOND SHAPED GRAPHIC

| DOT ROW | BINARY REPRESENTATION | | | | | |
|---|---|---|---|---|---|---|
| | BYTE 1 | BYTE 2 | BYTE 3 | BYTE 4 | BYTE 5 | BYTE 6 |
| 1 | 00000000 | 00000000 | 00000001 | 10000000 | 00000000 | 00000000 |
| 2 | 00000000 | 00000000 | 00000011 | 11000000 | 00000000 | 00000000 |
| 3 | 00000000 | 00000000 | 00000111 | 11100000 | 00000000 | 00000000 |
| 4 | 00000000 | 00000000 | 00001111 | 11110000 | 00000000 | 00000000 |
| 5 | 00000000 | 00000000 | 00011111 | 11111000 | 00000000 | 00000000 |
| 6 | 00000000 | 00000000 | 00111111 | 11111100 | 00000000 | 00000000 |
| 7 | 00000000 | 00000000 | 01111111 | 11111110 | 00000000 | 00000000 |
| 8 | 00000000 | 00000000 | 11111111 | 11111111 | 00000000 | 00000000 |
| 9 | 00000000 | 00000001 | 11111111 | 11111111 | 10000000 | 00000000 |
| 10 | 00000000 | 00000011 | 11111111 | 11111111 | 11000000 | 00000000 |
| 11 | 00000000 | 00000111 | 11111111 | 11111111 | 11100000 | 00000000 |
| 12 | 00000000 | 00001111 | 11111111 | 11111111 | 11110000 | 00000000 |
| 13 | 00000000 | 00011111 | 11111111 | 11111111 | 11111000 | 00000000 |
| 14 | 00000000 | 00111111 | 11111111 | 11111111 | 11111100 | 00000000 |
| 15 | 00000000 | 01111111 | 11111111 | 11111111 | 11111110 | 00000000 |
| 16 | 00000000 | 11111111 | 11111111 | 11111111 | 11111111 | 00000000 |
| 17 | 11111111 | 11111111 | 11111111 | 11111111 | 11111111 | 11111111 |
| 18 | 11111111 | 11111111 | 11111111 | 11111111 | 11111111 | 11111111 |
| 19 | 00000000 | 11111111 | 11111111 | 11111111 | 11111111 | 00000000 |
| 20 | 00000000 | 01111111 | 11111111 | 11111111 | 11111110 | 00000000 |
| 21 | 00000000 | 00111111 | 11111111 | 11111111 | 11111100 | 00000000 |
| 22 | 00000000 | 00011111 | 11111111 | 11111111 | 11111000 | 00000000 |
| 23 | 00000000 | 00001111 | 11111111 | 11111111 | 11110000 | 00000000 |
| 24 | 00000000 | 00000111 | 11111111 | 11111111 | 11100000 | 00000000 |
| 25 | 00000000 | 00000011 | 11111111 | 11111111 | 11000000 | 00000000 |
| 26 | 00000000 | 00000001 | 11111111 | 11111111 | 10000000 | 00000000 |
| 27 | 00000000 | 00000000 | 11111111 | 11111111 | 00000000 | 00000000 |
| 28 | 00000000 | 00000000 | 01111111 | 11111110 | 00000000 | 00000000 |
| 29 | 00000000 | 00000000 | 00111111 | 11111100 | 00000000 | 00000000 |
| 30 | 00000000 | 00000000 | 00011111 | 11111000 | 00000000 | 00000000 |
| 31 | 00000000 | 00000000 | 00001111 | 11110000 | 00000000 | 00000000 |
| 32 | 00000000 | 00000000 | 00000111 | 11100000 | 00000000 | 00000000 |
| 33 | 00000000 | 00000000 | 00000011 | 11000000 | 00000000 | 00000000 |
| 34 | 00000000 | 00000000 | 00000001 | 10000000 | 00000000 | 00000000 |

FIG. 5

RASTER GRAPHICS DATA FOR PRINTING THE DIAMOND SHAPED GRAPHIC

| DOT ROW | BINARY REPRESENTATION | | | | | | RASTER DATA COMMANDS | | | | | | |
|---|---|---|---|---|---|---|---|---|---|---|---|---|---|
| | BYTE 1 | BYTE 2 | BYTE 3 | BYTE 4 | BYTE 5 | BYTE 6 | | | | | | | |
| 1  | 00000000 | 00000000 | 00000001 | 10000000 | 00000000 | 00000000 | Esc*b5W | 0 | 0 | 0 | 1   | 128 | 0 |
| 2  | 00000000 | 00000000 | 00000011 | 11000000 | 00000000 | 00000000 | Esc*b5W | 0 | 0 | 0 | 3   | 192 | 0 |
| 3  | 00000000 | 00000000 | 00000111 | 11100000 | 00000000 | 00000000 | Esc*b5W | 0 | 0 | 0 | 7   | 224 | 0 |
| 4  | 00000000 | 00000000 | 00001111 | 11110000 | 00000000 | 00000000 | Esc*b5W | 0 | 0 | 0 | 15  | 240 | 0 |
| 5  | 00000000 | 00000000 | 00011111 | 11111000 | 00000000 | 00000000 | Esc*b5W | 0 | 0 | 0 | 31  | 248 | 0 |
| 6  | 00000000 | 00000000 | 00111111 | 11111100 | 00000000 | 00000000 | Esc*b5W | 0 | 0 | 0 | 63  | 252 | 0 |
| 7  | 00000000 | 00000000 | 01111111 | 11111110 | 00000000 | 00000000 | Esc*b5W | 0 | 0 | 0 | 127 | 254 | 0 |
| 8  | 00000000 | 00000001 | 11111111 | 11111111 | 00000000 | 00000000 | Esc*b5W | 0 | 0 | 1 | 255 | 255 | 0 |
| 9  | 00000000 | 00000011 | 11111111 | 11111111 | 10000000 | 00000000 | Esc*b5W | 0 | 0 | 3 | 255 | 255 | 128 |
| 10 | 00000000 | 00000111 | 11111111 | 11111111 | 11000000 | 00000000 | Esc*b5W | 0 | 0 | 7 | 255 | 255 | 192 |
| 11 | 00000000 | 00001111 | 11111111 | 11111111 | 11100000 | 00000000 | Esc*b5W | 0 | 0 | 15 | 255 | 255 | 224 |
| 12 | 00000000 | 00011111 | 11111111 | 11111111 | 11110000 | 00000000 | Esc*b5W | 0 | 0 | 31 | 255 | 255 | 240 |
| 13 | 00000000 | 00111111 | 11111111 | 11111111 | 11111000 | 00000000 | Esc*b5W | 0 | 0 | 63 | 255 | 255 | 248 |
| 14 | 00000000 | 01111111 | 11111111 | 11111111 | 11111100 | 00000000 | Esc*b5W | 0 | 0 | 127 | 255 | 255 | 252 |
| 15 | 00000000 | 11111111 | 11111111 | 11111111 | 11111110 | 00000000 | Esc*b5W | 0 | 0 | 255 | 255 | 255 | 254 |
| 16 | 00000001 | 11111111 | 11111111 | 11111111 | 11111111 | 00000000 | Esc*b5W | 0 | 1 | 255 | 255 | 255 | 255 |
| 17 | 11111111 | 11111111 | 11111111 | 11111111 | 11111111 | 11111111 | Esc*b5W | 255 | 255 | 255 | 255 | 255 | 255 |
| 18 | 11111111 | 11111111 | 11111111 | 11111111 | 11111111 | 11111111 | Esc*b5W | 255 | 255 | 255 | 255 | 255 | 255 |
| 19 | 00000000 | 11111111 | 11111111 | 11111111 | 11111110 | 00000000 | Esc*b5W | 0 | 0 | 255 | 255 | 255 | 254 |
| 20 | 00000000 | 01111111 | 11111111 | 11111111 | 11111100 | 00000000 | Esc*b5W | 0 | 0 | 127 | 255 | 255 | 252 |
| 21 | 00000000 | 00111111 | 11111111 | 11111111 | 11111000 | 00000000 | Esc*b5W | 0 | 0 | 63 | 255 | 255 | 248 |
| 22 | 00000000 | 00011111 | 11111111 | 11111111 | 11110000 | 00000000 | Esc*b5W | 0 | 0 | 31 | 255 | 255 | 240 |
| 23 | 00000000 | 00001111 | 11111111 | 11111111 | 11100000 | 00000000 | Esc*b5W | 0 | 0 | 15 | 255 | 255 | 224 |
| 24 | 00000000 | 00000111 | 11111111 | 11111111 | 11000000 | 00000000 | Esc*b5W | 0 | 0 | 7 | 255 | 255 | 192 |
| 25 | 00000000 | 00000011 | 11111111 | 11111111 | 10000000 | 00000000 | Esc*b5W | 0 | 0 | 3 | 255 | 255 | 128 |
| 26 | 00000000 | 00000001 | 11111111 | 11111111 | 00000000 | 00000000 | Esc*b5W | 0 | 0 | 1 | 255 | 255 | 0 |
| 27 | 00000000 | 00000000 | 01111111 | 11111110 | 00000000 | 00000000 | Esc*b5W | 0 | 0 | 0 | 127 | 254 | 0 |
| 28 | 00000000 | 00000000 | 00111111 | 11111100 | 00000000 | 00000000 | Esc*b5W | 0 | 0 | 0 | 63  | 252 | 0 |
| 29 | 00000000 | 00000000 | 00011111 | 11111000 | 00000000 | 00000000 | Esc*b5W | 0 | 0 | 0 | 31  | 248 | 0 |
| 30 | 00000000 | 00000000 | 00001111 | 11110000 | 00000000 | 00000000 | Esc*b5W | 0 | 0 | 0 | 15  | 240 | 0 |
| 31 | 00000000 | 00000000 | 00000111 | 11100000 | 00000000 | 00000000 | Esc*b5W | 0 | 0 | 0 | 7   | 224 | 0 |
| 32 | 00000000 | 00000000 | 00000011 | 11000000 | 00000000 | 00000000 | Esc*b5W | 0 | 0 | 0 | 3   | 192 | 0 |
| 33 | 00000000 | 00000000 | 00000001 | 10000000 | 00000000 | 00000000 | Esc*b5W | 0 | 0 | 0 | 1   | 128 | 0 |
| 34 | 00000000 | 00000000 | 00000000 | 00000000 | 00000000 | 00000000 | Esc*b5W | 0 | 0 | 0 | 0   | 0   | 0 |
| | RASTER IMAGE | | | | | | DECIMAL EQUIVALENT OF RASTER DATA | | | | | | |

METHOD FOR DOWNLOADING AND PRINTING BITMAPPED GRAPHICS

BACKGROUND OF THE INVENTION

The invention is a method for incorporating peripheral printers within a data processing system whereby the number of printer control commands required is reduced.

Currently, printers use different sets of commands for the downloading of bitmap graphics and bitmap font glyphs. The disclosure herein is a simplification of the current process by downloading and then printing bitmap graphics using the same set of printer control commands that are used to download and print bitmap font glyphs.

Soft font data and graphic images are stored on a host computer in a variety of formats. These data formats are converted to the printer control language by an application program and/or a printer driver running on the host. Currently, graphics images are converted to a special bitmap graphic format comprised of a group of printer commands designed for bitmap graphics printing and the bitmaps for each glyph in a soft font are converted to a different format comprised of another group of printer commands designed for downloading soft fonts.

The present invention overcomes the limitation of the prior art by streamlining the process. Streamlining is accomplished by using the same printer commands to download and print both graphics and fonts. The inventive step thus simplifies the firmware required in a selected printer and allows the use of a slower and less expensive microprocessor to drive a given application. Additionally, printer ROM memory can be reduced or freed up for other tasks, and RAM memory can be increased to handle more detailed data.

U.S. Pat. No. 5,150,456 for a GRAPHIC IMAGE PRINTING SYSTEM AND METHOD, issued Sep. 22, 1992 to Wu et al. discloses a high speed, low cost real time graphic image printing system which includes a host data processing system, a laser printer having a plug connector for receiving a font cartridge storing information defining an image of a printable character, and a cartridge pluggably connected to the font cartridge plug connector. A first communication path carries print commands from the host to the printer while a second communication path carries image defining information between the host and the data store. In operation, the host writes information defining a portion of an image to be printed into a portion of the data store corresponding to a selected character and then commands the printing of the selected character. A ping-pong double buffer arrangement allows the host to write a next image portion while information defining a current image portion is read by the printer to form a print image.

The current invention obviates the requirement of Wu et al. for using two communication paths. The result is a cheaper, more efficient, system that is commercially viable.

U.S. Pat. No. 4,520,455 for a PRINTING SYSTEM, issued May 28, 1985 to Crean et al., discloses the use of two buffers employed so that while the contents of one buffer are used to control the printer, the second buffer can be bit formatted under microprocessor control. And, while this configuration provides efficiency in that the signals representing desired print characters and the commands to the printer to actually print the characters are stored separately and can thus function independently; the downloading of graphics and/or fonts to the printer still require that the printer commands for the graphics be different from that of the fonts.

Printer controllers which control a printer shared with plural data processors are disclosed in U.S. Pat. No. 5,068,807 for a PRINTER CONTROLLER, issued Nov. 26, 1991 to Ikenoue. In this disclosure, as with others in the art, the printer commands follow two paths; that is, there are separate printer commands to download and print graphics or fonts.

U.S. Pat. No. 5,337,258 for COST METRICS, issued Aug. 9, 1994 to Dennis, discloses the use of separate printer commands to describe the transfer of font glyphs then are used when transferring bitmaps.

An object of the present invention is to overcome the limitations of the prior art by providing a method for printing that reduces unnecessary or duplicative command requirements in printing bitmapped graphic images.

SUMMARY OF THE INVENTION

According to the invention, the object is achieved and the disadvantages of the prior art are overcome by a method for using printer commands to download both graphics and fonts from a host computer.

A preferred embodiment of the present invention, can utilize as a platform a PC based mailing or addressing system using an AddressRight W-700 Envelope Printer developed and marketed by Pitney Bowes Inc. of Stamford, Conn. who is the assignee of the present application. Addressing systems utilizing the W-700, as with other typical systems in the art, generally include as its elements: a microprocessor with associated buffer and hard drive memory; a monitor; a printer such as the W-700; and, other peripheral devices as required. The system automatically prepares envelopes for mailing to any desired number of different locations by downloading addresses, barcode information; or graphics.

A selected application within the host computer will identify data that can be in the form of a graphic image or a soft font. The identified data to be used within the application is then downloaded to the printer utilizing a soft font command. A second command then acts as a printer driver command to actually cause the data to be printed on a substrate such as an envelope. The printer commands for downloading and printing can be utilized for both graphic images and soft fonts, rather then requiring that a separate command be utilized for each.

BRIEF DESCRIPTION OF THE DRAWINGS

FIG. 4 is a table of the raster data required to produce a given graphic.

FIG. 5 is a table of the raster graphics data and commands required to download a graphic image.

DETAILED DESCRIPTION OF THE PREFERRED EMBODIMENTS

Figure 1:
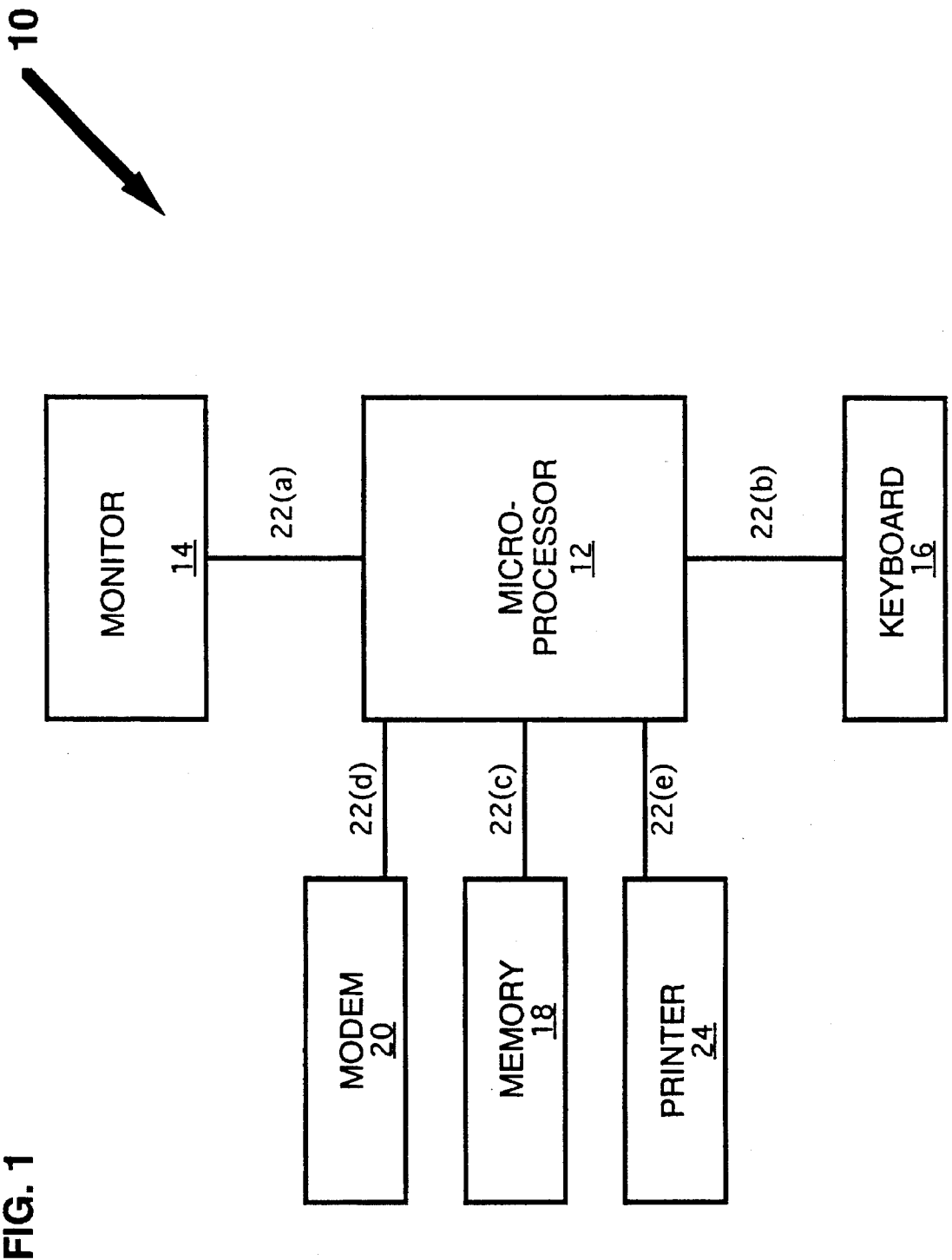
FIG. 1 is a flow chart of an addressing system which may incorporate the present invention.

Turning to FIG. 1, addressing system 10 includes: microprocessor 12 connected to monitor 14 by serial interface cable 22a; keyboard 16 connected to microprocessor 12 by serial interface cable 22b; memory 18 connected to microprocessor 12 by serial interface cable 22c; printer 24 connected to microprocessor 12 by serial interface cable 22e; and, modem 20 connected to microprocessor 12 by serial interface cable 22d.

A microcomputer, or any computer that can download data that can be printed on a printer whether that printer is a peripheral device of the computer or not, uses application programs for creating data. Additionally, a font engine, which resides typically within the application program but may be a separate program or an external program, is used for creating soft fonts that are utilized for printing to a substrate.

Graphics images are separate from soft fonts and are composed of bitmaps of the desired graphic bundled into a set of graphics download commands.

Figure 2:
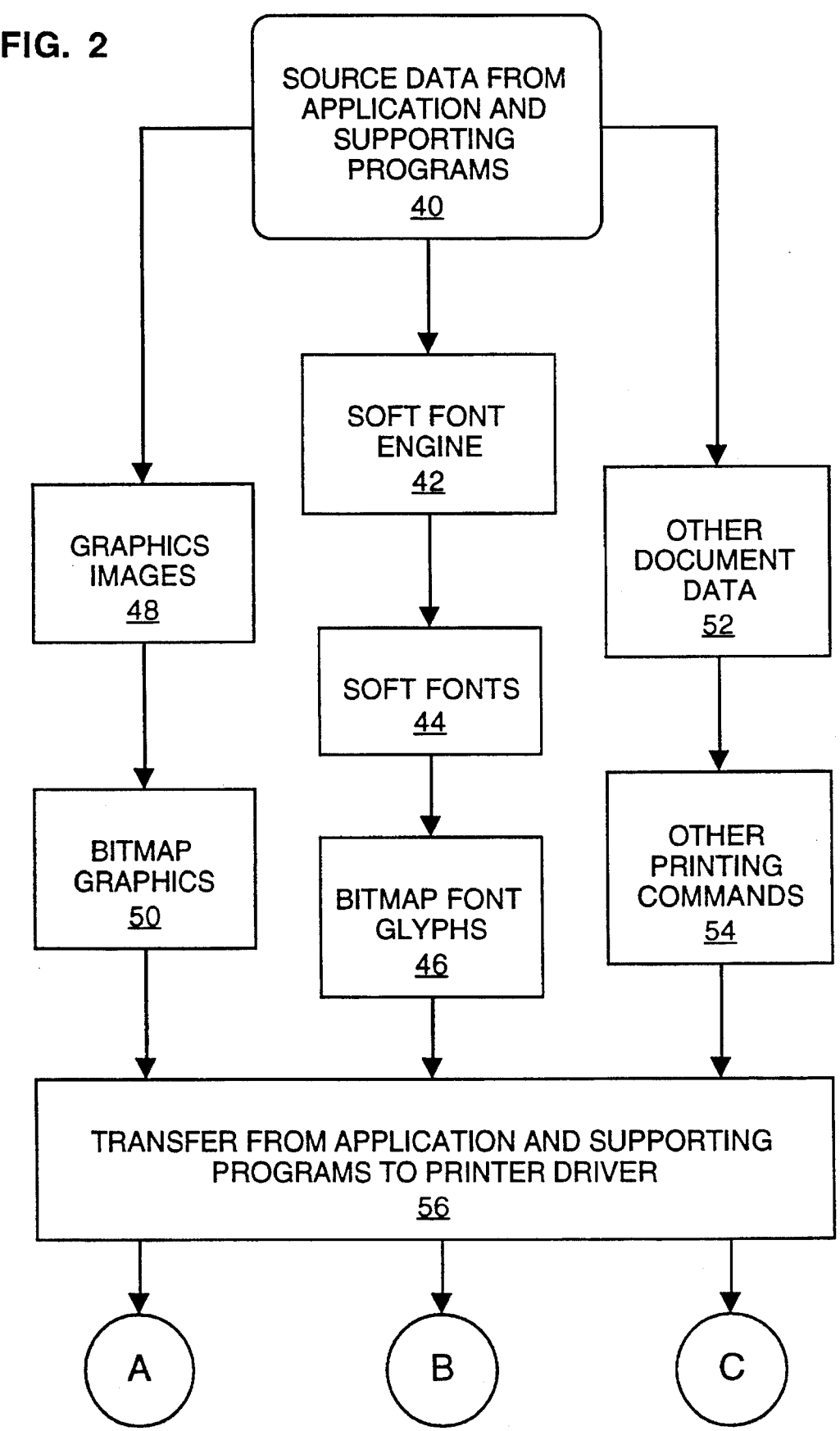
FIG. 2 and FIG. 2A is a flow chart of the method to be employed while utilizing the system of FIG. 1.
Figure 2A:
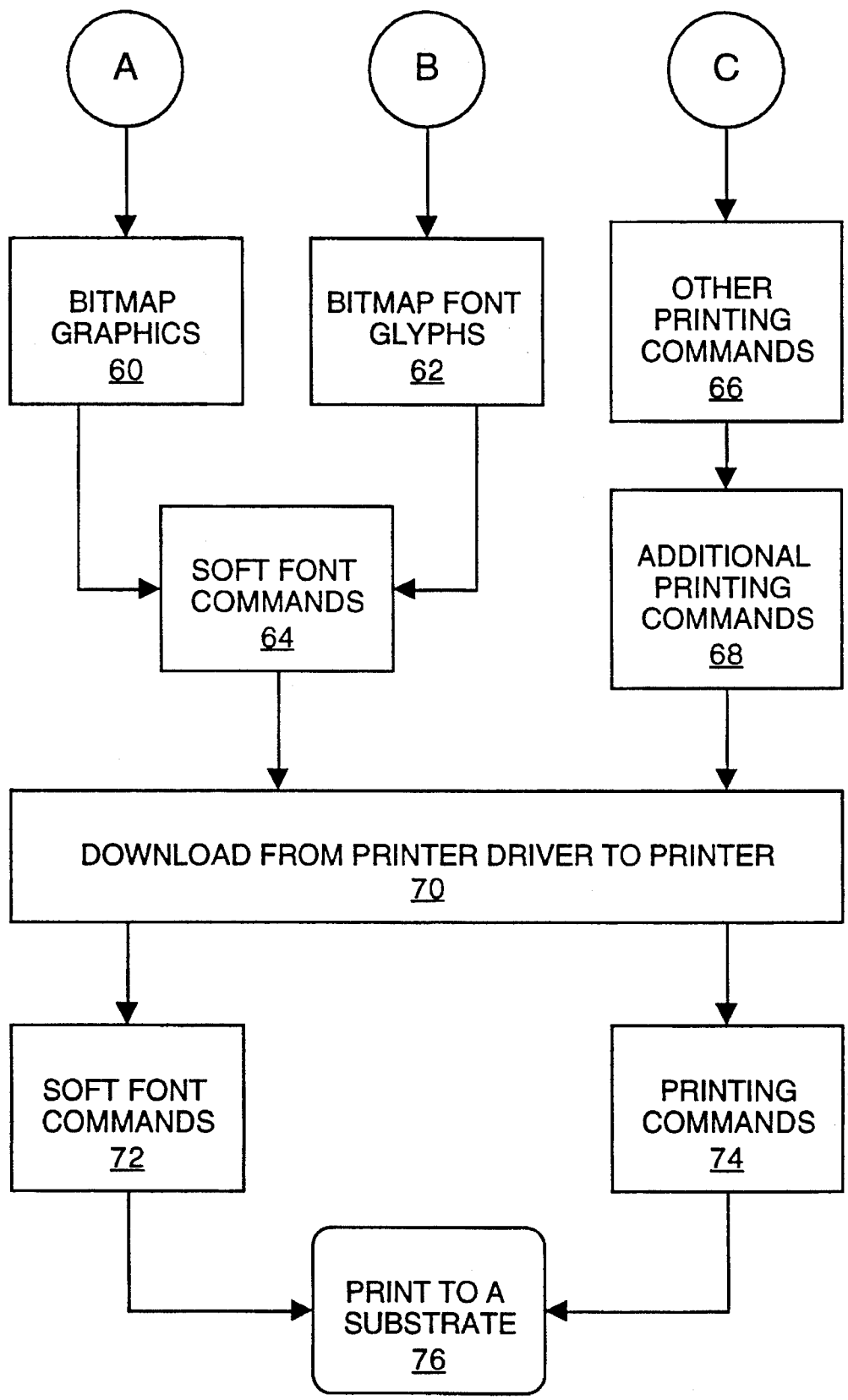

Turning to FIG. 2, source data 40 is produced by a microcomputer application; this data may be in the form of: graphics images 48; selection of soft fonts 44 to be produced by a soft font engine 42; or, other document data 52.

In selecting a soft font 44 for the printing of text, the application indicates to soft font engine 42 that soft fonts 44 must be created for a given font type. Soft fonts 44 are a set of bitmaps used to print text in the form of a bitmap font glyph and each will generally contain up to 256 individual bitmaps using binary representations to portray the full range of variations that exist for each font type. Each soft font has a font header that gives an overview of the entire set of bitmaps in the given font; the header information may include, but is not limited to: stroke weight (bold, thin, etc.); style (whether italic, upright, or some other available style); spacing (proportional or fixed); average design height; top and left offset of the character within a character cell; and the height and width of the bitmap. A typical bitmap is represented in FIG. 4.

Once soft fonts 44 or graphics images 48 have been downloaded 56, they may be managed or selected using a header assigned when the soft font or graphics image was created. Downloaded soft fonts 44, or graphics images 48, may also be selected by characteristic or character set as determined by the printer driver selected by the host application.

The font engine 42 will select the appropriate character from the bitmaps within soft fonts 44 and produce a bitmap font glyph 46 which is then downloaded 56 from the application to the printer driver. The bit map font glyphs 46 when transferred 56 to the printer driver are then designated as bit map font glyphs 62. The driver for the selected printer 24 converts the bitmap font glyph 62 to soft font commands 64 which contain header information that identify the font. The soft font commands 64 are downloaded 70 from the printer driver to the printer 24 over serial interface 22(c). Soft font commands 64 when downloaded to the printer 24 are then designated as soft font commands 72. Printer 24 parses the soft font command 72 and stores the command in memory to await other printing commands 74 before printing 80 the selected character to a substrate.

In order to print text using soft font commands 72, source data 40 must generate other document data 52 which is in the form of text strings (e.g. ASCII code) in binary representation (base 2). Other document data 52 would also include instructions concerning: paper size and margin definitions; macro control; printer set-up commands; and, positioning information. The other document data 52 is conveyed by the application into other printing commands 54 which are a series of printer commands that are in the form of ASCHII escape sequences.

The other printing commands are transferred 56 by the application program to the printer driver where they are designated as other printing commands 66 and assigned additional printing commands 68. The additional printing commands 68 include a font selection command, followed by a cursor positioning command, followed by a character code for a particular soft font character that has already been downloaded 70 to the printer 24 and is stored in memory. Other printing commands 66 and additional printing commands 68 are then downloaded 70 to printer 24 where soft font command 72 is pulled from printer 24 memory and the selected character is printed 76 to a substrate.

Figure 3:
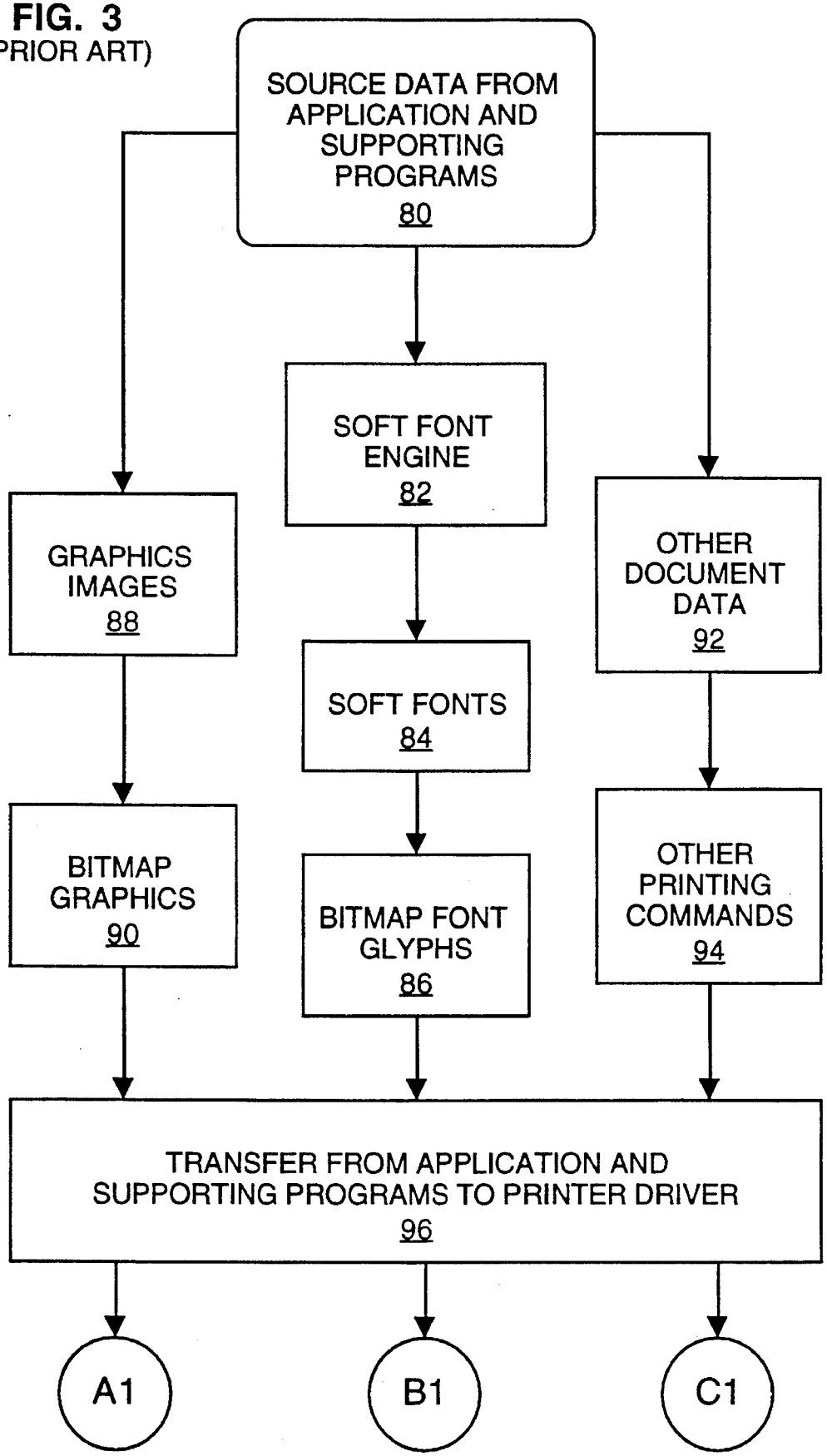
FIG. 3 and FIG. 3A is a flow chart of the method of a typical prior art process.
Figure 3A:
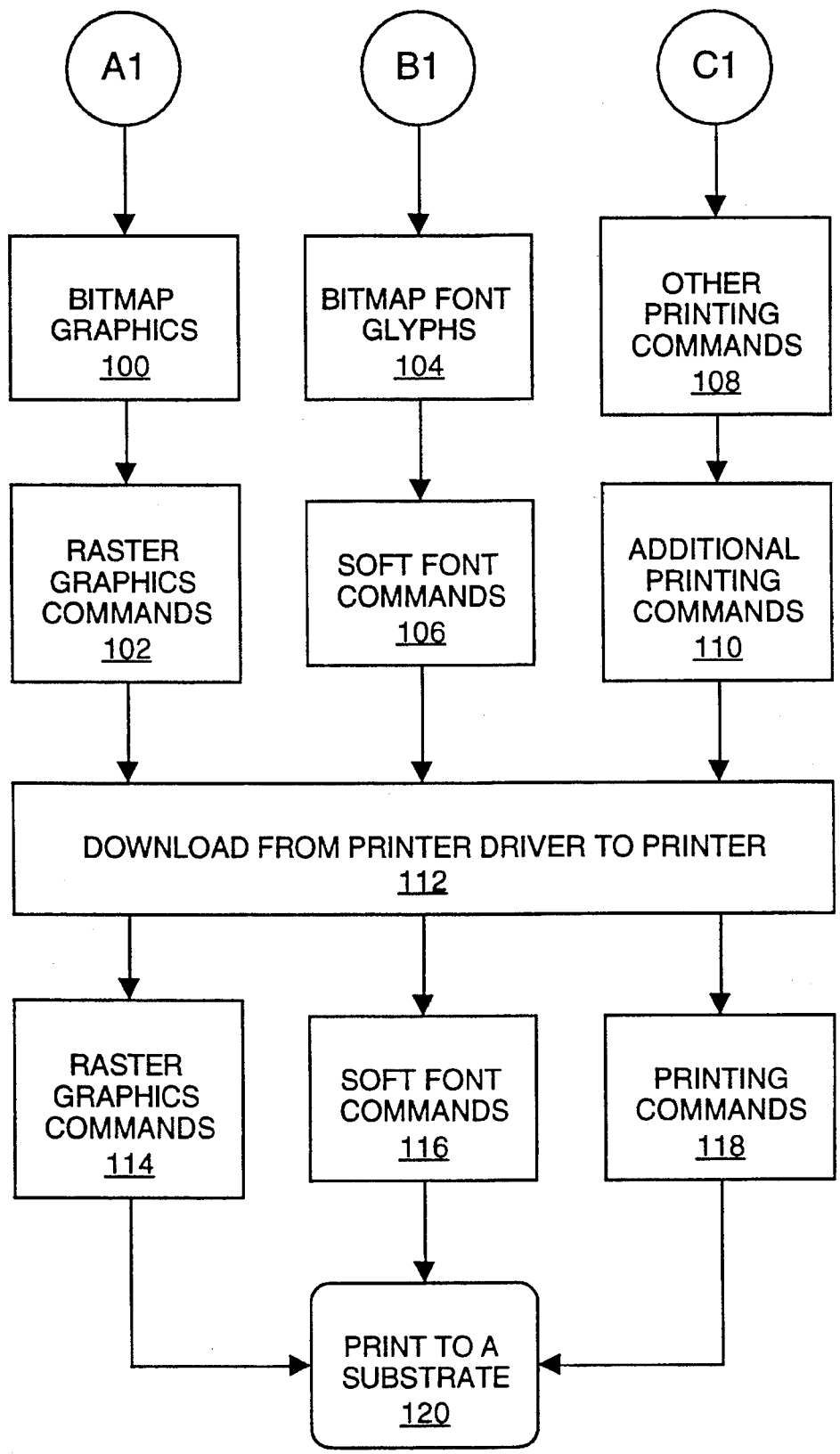

In the preferred embodiment of the subject invention, the printing of graphics images is extremely important. In order to print graphics, the typical prior art system, as depicted in FIGS. 3 and 3A, used raster graphics commands 102 that exist in parallel to soft font commands 106. The present invention overcomes the limitations of the prior art by using soft font commands 72 to print 76 graphics to a substrate.

Source data 40 from the application program represents a graphic image 48 that is converted by the application into a binary representation in bitmap form which depicts bitmap graphic 50. An example of a graphic image in bitmap form is depicted in FIG. 4. Bitmap graphics 50 are transferred 56 by the application to the printer driver whereby they are designated bitmap graphics 60. The printer driver takes the graphic image and assumes that the image is a soft font with only one character in the font set. The printer driver creates a "dummy" font header which would designate what is needed to print a single character. The printer driver then creates a "dummy" character header which lists information about a specific bitmap even though there is only one bitmap within the soft font. The creation of the "dummy" font header and the "dummy" character header has created a soft font command 64 which is then downloaded 70 from the printer driver to the printer 24. The soft font command 64 is redesignated soft font command 72. It is important to note that soft font commands do not cause the printer 24 to actually print; printing 76 to the substrate is the result of the printer 24 receiving a printing command 74. Therefore, a font selection command, a cursor positioning command, and a character code must be added to the soft font command 64, so that when the command is downloaded 70 to the printer 24 it will print 76 to the substrate.

By converting bitmap graphic 60 to soft font command 64 and adding a font selection command, a cursor positioning command, and a character code, the method of printing bitmapped graphics has eliminated the need for separate raster graphics commands.

FIGS. 3 and 3A represent the flow of a typical prior art method of printing text and graphics.

In FIGS. 3 and 3A, source data 80 from the application utilizes soft font engine 82 to produce soft fonts 84. Soft fonts 84 are converted to bitmap font glyphs 86 and then transferred 96 from the application to the printer driver. After transferring 96 bitmap font glyphs 86 to the printer driver, the font glyphs are redesignated as bitmap font glyphs 104 and these are assigned soft font commands 106 before being downloaded 112 from the printer driver to printer 24. After downloading 112, soft font commands 106 are redesignated as soft font commands 116 and then stored in the printer 24 memory.

Additionally, in FIGS. 3 and 3A, source data 80 from the application produces other document data 92 which are assigned other printing commands 94 and transferred 96 from the application to the printer driver. Other printing commands 94 are redesignated as other printing commands 108 to which are added additional printing commands 110 prior to being downloaded 112 from the printer driver to the printer as printing commands 118. Printing commands 118 pull the appropriate soft font commands 116 from the printer 24 memory and print 120 the desired data.

The use of raster graphics commands 114 is illustrated in FIGS. 3 and 3A. Source data 80 from the application produces graphic images 88 which are converted to bitmap graphics 90 and transferred 96 from the application to the printer driver. Bitmap graphics 90 are redesignated as bitmap graphics 100 and assigned raster graphics commands 102. FIG. 5 is an example of the conversion of the binary representation of a bitmap graphic into the selected raster data commands which include the required escape sequence or printer command. The raster graphics commands 102 are downloaded from the printer driver to the printer 24 where combined with raster graphics commands 114 they are printed 120 to the substrate.

As can be appreciated by those skilled in the art, a number of variations of the subject invention are possible. These variations include, but are not limited to: the range of printer types that can utilize the inventive method; the applications that produce the data to be converted into bitmapped graphics; the downloading of the soft font, printer or similar commands to tape, diskette or similar storage medium for the purpose of transferring the commands to a printer that is not operatively connected to the host application; and, the general configuration of the host computer and its array of peripherals.

What is claimed is:

1. A method for printing bitmapped graphics, comprising the steps of:

(a) deriving a first set of source data, from a selected application in a computer, wherein said first set of source data is in the form of a graphic image; and, if text is required together with said graphic image, then deriving a second set of source data, from a selected application in said computer, wherein said second set of source data is in the form of a bitmap font glyph;

(b) converting said graphic image into a bitmapped graphic;

(c) transferring said bitmapped graphic and said bitmap font glyph, from said selected application, to a printer driver;

(d) assigning a first set of identifying headers to said transferred bitmapped graphic and assigning a second set of identifying headers to said bitmap font glyph;

(e) downloading said bitmapped graphic and said first set and said second set of identifying headers, from said printer driver to a printer means for printing on a substrate; and (f) printing said downloaded bitmapped graphic to said substrate.

2. The method of claim 1, wherein said identifying headers are representative of a soft font:

the soft font containing a single bitmap.

3. The method of claim 1, wherein said identifying headers contain data concerning print parameters for said single bitmap.

4. The method of claim 1 wherein said substrate is one or more cut sheets.

5. The method of claim 1 wherein said substrate is a continuous roll.

6. The method of claim 1 wherein said substrate is one or more envelopes.

7. The method of claim 1, wherein said printing of said downloaded bitmapped graphic is by a printer operatively connected to said computer.

8. The method of claim 1, wherein said printing of said downloaded bitmapped graphic is by a printer not operatively connected to said computer.

* * * * *